(12) United States Patent
Xing et al.

(10) Patent No.: US 12,376,723 B2
(45) Date of Patent: Aug. 5, 2025

(54) AUTONOMOUS MOBILE DEVICE AND CONTROL METHOD THEREOF

(71) Applicant: Qfeeltech (Beijing) Co., Ltd., Beijing (CN)

(72) Inventors: Xingguo Xing, Beijing (CN); Xin Wu, Beijing (CN); Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 331 days.

(21) Appl. No.: 18/065,771

(22) Filed: Dec. 14, 2022

(65) Prior Publication Data

US 2023/0116867 A1    Apr. 13, 2023

Related U.S. Application Data

(63) Continuation of application No. PCT/CN2021/100592, filed on Jun. 17, 2021.

(30) Foreign Application Priority Data

Jun. 22, 2020   (CN) .......................... 202010575114.4

(51) Int. Cl.
*A47L 11/40* (2006.01)
*G01S 15/931* (2020.01)
(Continued)

(52) U.S. Cl.
CPC ....... *A47L 11/4011* (2013.01); *A47L 11/4002* (2013.01); *A47L 11/4061* (2013.01);
(Continued)

(58) Field of Classification Search
CPC ...... A47L 11/24; A47L 11/40; A47L 11/4011; A47L 11/4002; A47L 11/4061;
(Continued)

(56) References Cited

U.S. PATENT DOCUMENTS

| 2011/0108064 A1 | 5/2011 | Hillman, Jr. et al. |
| 2019/0227566 A1* | 7/2019 | Marutani ............. G05D 1/0246 |

(Continued)

FOREIGN PATENT DOCUMENTS

| CN | 205514408 U | 8/2016 |
| CN | 107625489 A | 1/2018 |

(Continued)

OTHER PUBLICATIONS

International Search Report and Written Opinion issued on Aug. 27, 2021, in PCT/CN2021/100592, and English machine translations thereof (15 pages).

(Continued)

*Primary Examiner* — Aaron L Troost
(74) *Attorney, Agent, or Firm* — MILLBURN IP PLLC

(57) ABSTRACT

An autonomous mobile device and a control method are disclosed. The autonomous mobile device includes a main body and an imaging device, a detecting device, a light source assembly, and a controller disposed at the main body. The imaging device is configured to acquire image information in a predetermined direction of the main body. The predetermined direction includes an upward direction of the main body. The detecting device is configured to detect obstacle information in the upward direction of the main body. A light outputting direction of the light source assembly includes the upward direction of the main body. The controller is configured to, when the detecting device detects (Continued)

the obstacle within a predetermined distance range in the upward direction of the main body, control the light source assembly to turn on to provide illumination for the imaging device.

20 Claims, 6 Drawing Sheets

(51) Int. Cl.
  *G01S 17/931* (2020.01)
  *G05D 1/00* (2024.01)
  *G06V 10/141* (2022.01)
  *G06V 20/58* (2022.01)
  *H04N 23/71* (2023.01)
  *H04N 23/74* (2023.01)

(52) U.S. Cl.
  CPC .......... *G01S 15/931* (2013.01); *G01S 17/931* (2020.01); *G06V 10/141* (2022.01); *G06V 20/58* (2022.01); *H04N 23/71* (2023.01); *H04N 23/74* (2023.01); *A47L 2201/04* (2013.01); *G05D 1/0246* (2013.01)

(58) Field of Classification Search
  CPC . A47L 2201/04; G01S 15/931; G01S 17/931; G06V 10/141; G06V 20/58; H04N 23/71; H04N 23/74; G05D 1/0246
  See application file for complete search history.

(56) References Cited

U.S. PATENT DOCUMENTS

| | | | |
|---|---|---|---|
| 2019/0243369 A1* | 8/2019 | Wang | ................. G01S 17/931 |
| 2020/0022551 A1* | 1/2020 | Watanabe | ........... A47L 11/4011 |
| 2020/0178748 A1* | 6/2020 | Han | ......................... A47L 9/28 |

FOREIGN PATENT DOCUMENTS

| | | | |
|---|---|---|---|
| CN | 107752910 A | | 3/2018 |
| CN | 107997687 A | | 5/2018 |
| CN | 207424680 U | | 5/2018 |
| CN | 108814432 A | | 11/2018 |
| CN | 109044193 A | | 12/2018 |
| CN | 210673215 U | | 6/2020 |
| CN | 212521687 U | | 2/2021 |
| JP | 2019063354 A | * | 4/2019 |
| KR | 102103291 B1 | | 5/2020 |

OTHER PUBLICATIONS

First Office Action dated Dec. 18, 2024, issued in Chinese Patent Application No. 202010575114.4, filed on Jun. 22, 2020, and English machine translation thereof (14 pages).

* cited by examiner

AUTONOMOUS MOBILE DEVICE AND CONTROL METHOD THEREOF

CROSS REFERENCE TO RELATED APPLICATIONS

This application is a continuation of International Application No. PCT/CN2021/100592, filed on Jun. 17, 2021, which claims priority to a patent application file in the Chinese Patent Office on Jun. 22, 2020, Application No. 202010575114.4, and titled "Autonomous Mobile Device and Control Method Thereof." The contents of the above-mentioned applications are incorporated herein by reference by their entirety.

TECHNICAL FIELD

The present invention relates to smart home technology field, and in particular, to an autonomous mobile device and a control method thereof.

BACKGROUND

As the technology advances and the living condition improves, more and more autonomous mobile devices equipped with various artificial intelligence functions enter people's homes, such as cleaning robots, companion type mobile robots, etc., which make people's life more comfortable and convenient.

Using cleaning robots as an example, a cleaning robot can be used to clean the floor of a room. The cleaning robot includes a main body and a motion assembly, an imaging device and a cleaning assembly disposed on the main body. The motion assembly is configured to cause the main body to move. During a movement of the main body, the imaging device acquires image information within the room in real time, such as image information of obstacles located at the ceiling of the room or within the room, and extracts feature points based on the image information, to assist in indoor localization and navigation. In the meantime, the cleaning assembly performs the floor cleaning tasks. The main body may determine the location and operation status of the cleaning robot based on the image information and a total mileage of the movement of the main body, and perform corresponding processes based on the operation status. For example, when the image information acquired by the imaging device at consecutive time instances is consistent, and the total mileage is continuously increasing, then the cleaning robot is in a jammed status, and the cleaning robot can issue an alarm to alert the user.

However, when the cleaning robot is under an obstacle, for example, under the bottom of a bed or a sofa, the light intensity is low under the obstacle, the imaging device has difficulty in acquiring image information of a side of the obstacle facing the floor. Accordingly, the cleaning robot has difficulty in determining the current operation status.

SUMMARY OF THE DISCLOSURE

An object of the present disclosure is to provide an autonomous mobile device and a control method thereof. The autonomous mobile device can obtain image information of a lower side of the obstacle facing the floor when the autonomous mobile device is under the obstacle, which enables the autonomous mobile device to determine the operation status.

In a first aspect, the present disclosure provides an autonomous mobile device, which includes: a main body and an imaging device, a detecting device, a light source assembly, and a controller disposed at the main body. The imaging device is connected with the main body, and is configured to acquire image information in a predetermined direction of the main body. The predetermined direction includes an upward direction of the main body. The detecting device is connected with the main body, and is configured to detect obstacle information in the upward direction of the main body. The light source assembly is connected with the main body. A light outputting direction of the light source assembly includes the upward direction of the main body. The controller is electrically connected with the detecting device and the light source assembly. When the detecting device detects an obstacle within a predetermined distance range in the upward direction of the main body, the controller is configured to control the light source assembly to turn on, to illuminate a lower surface of the obstacle located in the upward direction of the main body, to provide illumination for the imaging device.

According to the technical solution provided by the present disclosure, the autonomous mobile device includes the main body. The main body includes components such as the imaging device, the detecting device, the light source assembly, and the controller, etc. The main body can move on a floor or other work surface. During the movement of the main body, the detecting device is configured to detect whether an obstacle exists within a predetermined distance range in the upward direction of the main body. The imaging device is configured to acquire the image information in the predetermined direction of the main body during the movement of the main body. The predetermined direction includes at least the upward direction of the main body. When the detecting device detects the obstacle within the predetermined distance range in the upward direction of the main body, the controller can control the light source assembly to turn on. The light source assembly illuminates a side of the obstacle facing the floor, such that the autonomous mobile device is not affected by the light intensity in the space under the obstacle, the imaging device can still acquire the image information of the side of the obstacle facing the floor, and the autonomous mobile device can still determine the operation status of itself based on the image information and motion parameter information of the main body. It is noted that without the extra illumination provided by the light source assembly, the light intensity under the obstacle may vary from time to time in a day, which may affect the feature extraction from images of the lower surface of the obstacle captured by the autonomous mobile device, which may further affect the localization and mapping based on the extracted features performed by the autonomous mobile device.

In some embodiments, the detecting device includes a first detector. The first detector includes a first transmitting terminal and a first receiving terminal. The first transmitting terminal is configured to transmit a first detecting light in the upward direction of the main body. The first receiving terminal is configured to receive a reflected light of the first detecting light generated when the first detecting light is reflected back by the obstacle. The first detector detects, based on the reflected light, whether an obstacle exists within the predetermined distance range in the upward direction of the main body. Alternatively, the first transmitting terminal is configured to transmit a detecting wave in the upward direction of the main body. The first receiving terminal is configured to receive a reflected wave. The reflected wave is a wave generated through reflection when the detecting wave is reflected back by the obstacle. The first detector determines, based on the reflected wave, whether an obstacle exists within the predetermined distance range in the upward direction of the main body. As such, the detecting device detects whether an obstacle exists in the upward direction of the autonomous mobile device based on an infrared light or a laser, and the detection is not affected by the light intensity in the space under the obstacle, which makes the use of the autonomous mobile device more convenient.

In some embodiments, the first detector is one or more of an infrared diode detector, a laser distance measuring sensor, or an ultrasonic sensor. The first detector has a low cost, and is easy to obtain.

In some embodiments, the detecting device includes a second detector. The second detector includes a second transmitting terminal and a second receiving terminal. The second transmitting terminal is configured to transmit a second detecting light in the upward direction of the main body. The second receiving terminal is configured to receive image information carried by a reflected light of the second detecting light generated when the second detecting light is reflected back by the obstacle. The second detector determines, based on the reflected light, whether an obstacle exists within the predetermined distance range in the upward direction of the main body. As such, the second detector can determine whether an obstacle exists within the predetermined distance range through acquiring the image information in the upward direction of the main body.

In some embodiments, the second transmitting terminal is a structured light transmitter. The second receiving terminal is an image acquiring device. Acquisition of the image information by the image acquiring device is not affected by the light intensity of the space where the image acquiring device is located, making it convenient for the image acquiring device to acquire the image information of the hollow-lower-portion type obstacle.

In some embodiments, in the forward direction of the main body, the detecting device is located in front of the light source assembly and the imaging device. As such, when the autonomous mobile device moves forward, the detecting device may detect the obstacle before (i.e., ahead of) the light source assembly and the imaging device enter the space under the obstacle. The light source assembly may be turned on in advance before the light source assembly and the imaging device enter the space under the obstacle. Alternatively, the detecting device is flush with the light source assembly and the imaging device. As such, the detecting device is not affected by the forward or backward movement of the autonomous mobile device. When the detecting device detects an obstacle within the predetermined distance range above the autonomous mobile device, the light source assembly may be turned on simultaneously, making it convenient for the imaging device to acquire the image information of the lower side of the obstacle facing the floor.

In some embodiments, the predetermined distance range is smaller than or equal to 0.85 m, which can cover different types of hollow-lower-portion type obstacles. In other words, if the obstacle detected by the detecting device is within (e.g., smaller than or equal to) 0.85 m from the detecting device or the upper surface of the main body of the autonomous mobile device, the light source assembly may be turned on to provide illumination to the imaging device. If the obstacle detected by the detecting device is more than 0.85 m from the detecting device or the upper surface of the main body of the autonomous mobile device, the light source assembly may not be turned on to provide illumination to the imaging device.

In some embodiments, a light outputting intensity of the light source assembly is adjustable. The detecting device also includes a distance measuring device. The distance measuring device is connected with the main body, and is configured to measure a distance between the main body and an obstacle located in the upward direction of the main body. The controller is electrically connected with the distance measuring device, and is configured to control the light outputting intensity of the light source assembly based on the distance measured by the distance measuring device between the main body and the obstacle located in the upward direction of the main body. The light outputting intensity of the light source assembly becomes higher as the distance increases, and the light outputting intensity of the light source assembly becomes lower as the distance decreases. That is, the light outputting intensity of the light source assembly may be controlled by the controller to be proportional to the distance between the lower surface of the obstacle facing the floor and the upper surface of the main body of the autonomous mobile device. As such, when the lower space under the hollow-lower-portion type obstacle has different heights (the height being the distance measured from the upper surface of the main body of the autonomous mobile device or the floor to the lower surface of the obstacle), after the light source assembly is turned on to provide an illumination with a light outputting intensity that is proportional to the heights, the lower space under the hollow-lower-portion type obstacle can have an illuminance within a predetermined illuminance range, thereby avoiding the situation of having an overly high or overly low illuminance when the height of the lower space under the hollow-lower-portion type obstacle is different. In some embodiments, the controller may determine whether the measured distance is within the predetermined distance range (e.g., smaller than or equal to 0.85 m). When the measured distance is not within the predetermined distance range (e.g., greater than 0.85 m), the controller may not turn on the light source assembly to provide illumination to the imaging device.

In some embodiments, the detecting device includes a light intensity measuring device. The light intensity measuring device is connected with the main body and is configured to measure an environmental light intensity of the space in the upward direction of the main body. The controller is electrically connected with the light intensity measuring device, and is configured to control whether the light source assembly outputs a light based on the environmental light intensity measured by the light intensity measuring device. Alternatively, the light outputting intensity of the light source assembly is adjustable, the controller is electrically connected with the light intensity measuring device, and is configured to control the light outputting intensity of the light source assembly based on the environmental light intensity measured by the light intensity measuring device. That is, the light outputting intensity of the light source assembly is adjusted based on the light intensity in the space where the autonomous mobile device is located, to avoid blinding the imaging device that renders the imaging device unable to effectively acquire image information.

In a second aspect, the present disclosure provides a method for controlling an autonomous mobile device, which is implemented in the autonomous mobile device according to the above-described first aspect. The method includes: detecting whether an obstacle exists within the predetermined distance range in the upward direction of the main body of the autonomous mobile device; based on a determination that the obstacle exists in the predetermined distance range in the upward direction of the main body, illuminating a lower surface of the obstacle located in the upward direction of the main body, to provide illumination for the imaging device.

In a third aspect, the present disclosure provides a non-transitory computer-readable storage medium. The non-transitory computer-readable storage medium stores a computer program. When the computer program is executed by a processor, the method for controlling the autonomous mobile device according to the above-described second aspect is performed.

Other aspects of the present disclosure can be understood by those skilled in the art in light of the description, the claims, and the drawings of the present disclosure.

BRIEF DESCRIPTION OF THE DRAWINGS

To more clearly describe the embodiments of the present disclosure or the technical solution of existing technology, a brief description will be provided to the accompanying drawings that are used for describing the embodiments or the existing technology. The accompanying drawings described below are merely some embodiments of the present disclosure. A person having ordinary skills in the art can obtain other drawings based on these accompanying drawings without spending creative effort. In the drawings.

LABELLING OF ACCOMPANYING DRAWINGS

Figure 1:
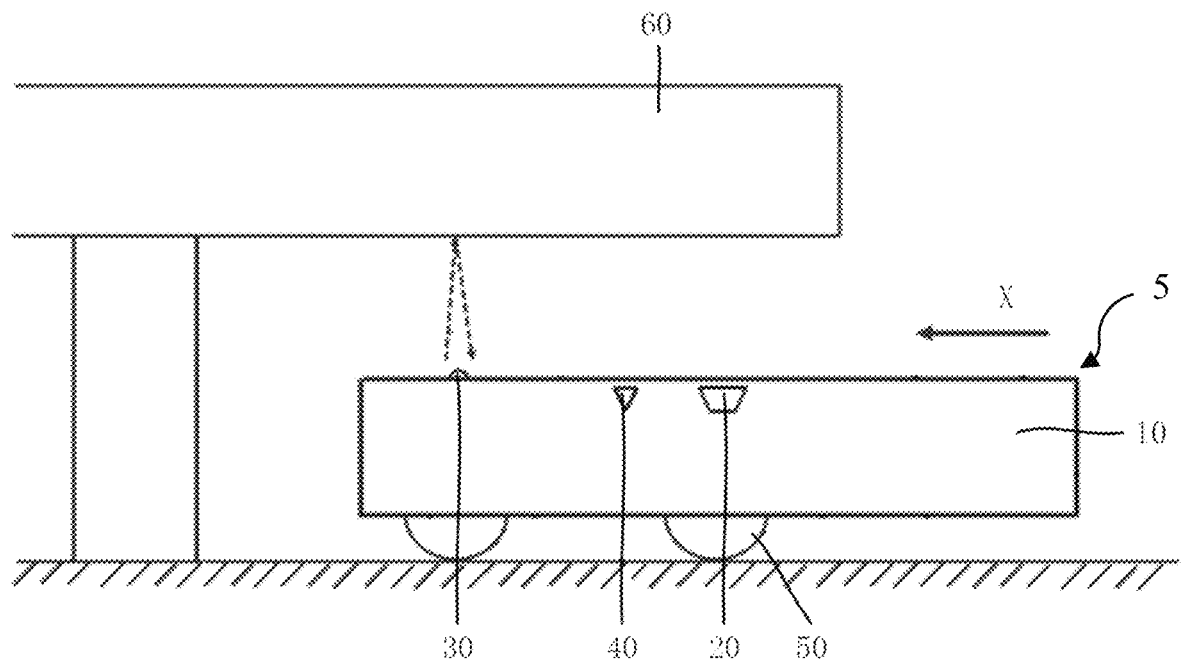
FIG. 1 is a schematic structural illustration of when an autonomous mobile device detects a hollow-lower-portion type obstacle, according to an embodiment of the present disclosure.

10: main body; 20: imaging device; 30: detecting device; 31: first detector; 311: first transmitting terminal; 312: first receiving terminal; 313: first detecting light; 314: reflected light; 32: second detector; 40: light source assembly; 50: motion assembly; 60: hollow-lower-portion type obstacle; 70: controller; 80: communication device; 90: storage device; 100: cleaning assembly; X: forward direction.

DETAILED DESCRIPTION

To better illustrate the above objectives and features and advantages of the embodiments of the present disclosure, next, the technical solutions of the embodiments of the present disclosure will be clearly and comprehensively described with reference to the accompanying drawings of the embodiments of the present disclosure. The embodiments described herein are merely some embodiments of the present disclosure, and are not all of the embodiments. Based on the embodiments of the present disclosure, a person having ordinary skills in the art can obtain other embodiments without spending creative effort, which are also within the scope of protection of the present disclosure.

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is shown or described as being disposed or arranged "on" a second element, it means that the first element is mounted to or installed at the second element. The first element may be disposed at any suitable portion of the second element, such as a top portion of the second element, a side portion of the second element, or a bottom portion of the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

An autonomous mobile device can operate under a random collision navigation mode, to cover a work zone. The autonomous mobile device can also preset a motion path, and move along the preset motion path. For an autonomous mobile device equipped with a visual system, the visual system can acquire image information of the surrounding environment of the autonomous mobile device. The autonomous mobile device can determine the operation status of itself based on the image information and motion parameter information such as linear velocity, angular velocity, motion mileage. For example, when the motion mileage measured by an odometer of the autonomous mobile device continuously increases, while the image information acquired by the visual system remains the same, it may be determined that the autonomous mobile device is in a malfunctioning status in which the autonomous mobile device is jammed by an obstacle or the autonomous mobile device is skidding. When the autonomous mobile device determines that itself is in the malfunctioning status, it can control itself to move backwardly or to issue an alarm, etc., to avoid exhaustion of electric power and mapping error.

However, when the autonomous mobile device is located under a hollow-lower-portion type obstacle (which may be referred to as an obstacle for simplicity of description), such as a bed, a table, a cabinet, a sofa, the light intensity under the obstacle is typically low, which renders the visual system unable to acquire image information of a side of the obstacle facing the floor. Alternatively, due to the light intensity change under the hollow-lower-portion type obstacle from time to time during a day, images of the lower surface of the obstacle captured by the imaging device may be different from time to time. Accordingly, feature points included in multiple images acquired by the autonomous mobile device in multiple times of imaging (e.g., during multiple rounds of entering the space under the obstacle) of a same obstacle may appear different, causing the autonomous mobile device to determine the same obstacle as not being the same obstacle (i.e., as being different obstacles). As a result, the autonomous mobile device experiences difficulty in determining the pose of itself and the operation status. In view of these, the embodiments of the present disclosure include a light source assembly disposed on the autonomous mobile device, such that when the autonomous mobile device is located under the obstacle, the light source assembly is turned on to emit a light in the upward direction of the autonomous mobile device to illuminate the lower side of the obstacle, to increase the light intensity at the lower side of the obstacle, thereby enabling the visual system to acquire image information of the side of the hollow-lower-portion type obstacle facing the floor at a suitable light intensity during different rounds of entering the same space under the same hollow-lower-portion type obstacle. As a result, it becomes easier to recognize the same feature information of the same obstacle based on image information acquired by imaging the same obstacle using the same light source at a suitable light intensity. Therefore, it becomes easier for the autonomous mobile device to recognize the same obstacle in multiple movements, which helps increase the accuracy of localization and mapping in SLAM (simultaneous localization and mapping).

Figure 2:
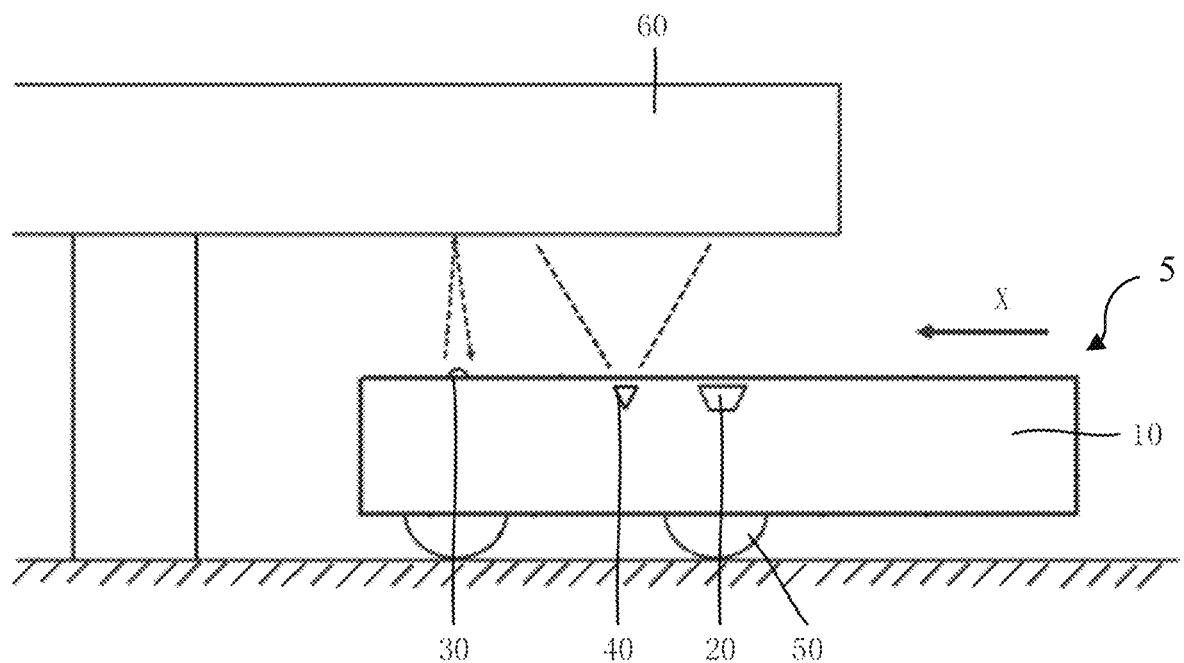
FIG. 2 is a schematic structural illustration of when the autonomous mobile device illuminates the hollow-lower-portion type obstacle, according to an embodiment of the present disclosure.
Figure 3:
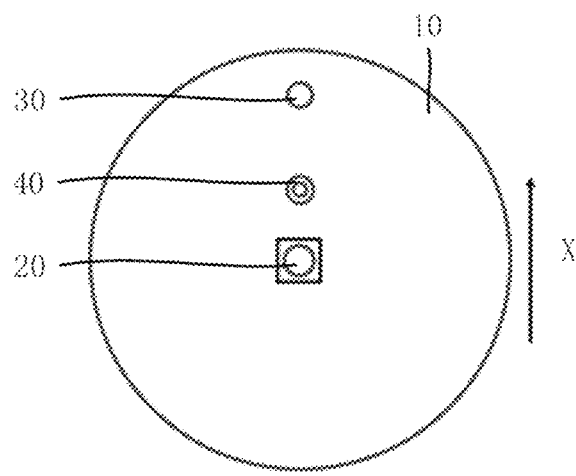
FIG. 3 is a top view of the autonomous mobile device shown in FIG. 1 and FIG. 2, according to an embodiment of the present disclosure.
Figure 4:
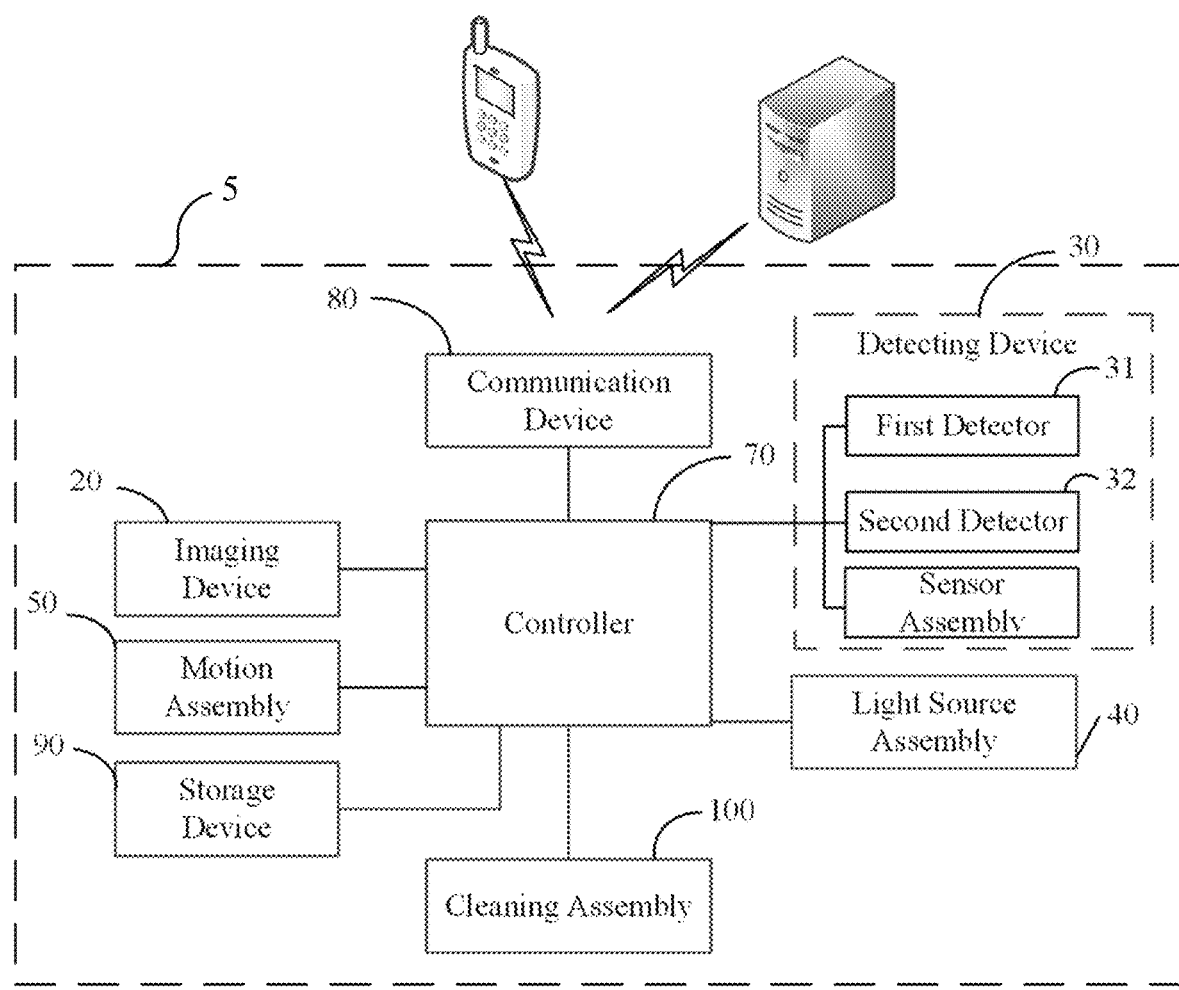
FIG. 4 is a schematic structural illustration of electrical connections of the autonomous mobile device, according to an embodiment of the present disclosure.

FIG. 1 is a schematic structural illustration of when an autonomous mobile device 5 detects a hollow-lower-portion type obstacle 60, according to an embodiment of the present disclosure. FIG. 2 is a schematic structural illustration of when the autonomous mobile device 5 illuminates the hollow-lower-portion type obstacle 60, according to an embodiment of the present disclosure. FIG. 3 is a top view of the autonomous mobile device 5 shown in FIG. 1 and FIG. 2, according to an embodiment of the present disclosure. FIG. 4 is a schematic structural illustration of electrical connections of the autonomous mobile device 5, according to an embodiment of the present disclosure. Referring to FIG. 1 to FIG. 4, an embodiment of the present disclosure provides an autonomous mobile device 5, which may include: a main body 10, and an imaging device 20, a detecting device 30, a light source assembly 40, and a controller 70 disposed on the main body 10. The imaging device 20 may be connected with the main body 10, and configured to acquire image information of objects (e.g., obstacles in the environment) in a predetermined direction of the main body 10. The predetermined direction may include an upward direction of the main body 10. For example, the imaging device 20 may acquire images of obstacles located above the main body 10, such as a table, a bed, a sofa, etc. The upward direction may include an upright (or straight) upward direction of the main body 10, an oblique upward direction of the main body 10, or may include both the upright upward direction and the oblique upward direction. The upright upward direction refers to a vertical upward direction that is substantially perpendicular to a horizontal axis of the main body 10. The oblique upward direction refers to a vertical upward direction that forms an acute angle with respect to the horizontal axis of the main body 10. The detecting device 30 may be connected with the main body 10, and configured to detect obstacle information in the upward direction of the main body 10. The light source assembly 40 may be connected with the main body 10. A light outputting direction of the light source assembly 40 may include the upward direction of the main body 10. That is, the light source assembly 40 may be arranged to point upward from the main body 10. The controller 70 may be electrically connected with the detecting device 30 and the light source assembly 40. When the detecting device 30 detects existence of the hollow-lower-portion type obstacle 60 having a hollow lower portion (hereinafter referred to as "obstacle 60" for simplicity of description) within a predetermined distance range in the upward direction of the main body 10, the controller 70 may control the light source assembly 40 to turn on, to illuminate a lower surface of the obstacle 60 located in the upward direction of the main body 10, thereby providing illumination for the imaging device 20. The additional illumination may enable the imaging device 20 to acquire clear images of the lower surface of the obstacle 60. The controller 70 may turn on the light source assembly 40 when the obstacle 60 is detected within the predetermined distance range. If no obstacle is detected within the predetermined distance range, or if an obstacle is detected but is out of the predetermined distance range, the controller 70 may not turn on the light source assembly 40. In some embodiments, the lower surface of the obstacle 60 may be at a straightly downward facing side of the obstacle 60, or may be a side surface that is at an obliquely downward facing side of the obstacle 60, or may be other surface of the obstacle 60 that can be illuminated by the light source assembly 40 located under the obstacle 60.

In some embodiments, the autonomous mobile device 5 may be a smart mobile device configured to autonomously execute predetermined tasks in a predetermined work zone. The autonomous mobile device 5 may be, but may not be limited to, a cleaning robot (e.g., a smart cleaning robot, a smart floor mopping robot, a window cleaning robot), a companion type mobile robot (e.g., a smart electric pet, a nanny robot), a service type mobile robot (e.g., a receptionist robot for a hotel, an inn, a meeting place, etc.), an industrial inspection smart robot (e.g., an electric power inspection robot, a smart forklift, etc.), a security robot (e.g., smart security robots for home use or commercial use), etc.

The present embodiment is described using a cleaning robot as an example.

As shown in FIG. 1 to FIG. 4, the autonomous mobile device 5 may include: the imaging device 20, the detecting device 30, a motion assembly 50, a communication device 80, a storage device 90, and the controller 70.

The autonomous mobile device 5 may also include the main body 10 (the main body 10 is not shown in FIG. 4). The main body 10 may be designed based on specific applications. The present embodiment does not limit the material, shape, and size of the main body 10.

In some embodiments, the communication device 80, the storage device 90, and the controller 70 may be disposed inside the main body 10. In some embodiments, the imaging device 20, the detecting device 30, and the light source assembly 40 may be disposed on the main body 10 or at least partially inside the main body 10. The present disclosure does not limit the locations of the various components included in the autonomous mobile device 5. In some embodiments, the motion assembly 50 may be disposed at a chassis provided on the main body 10 that is a portion of the main body 10, or may be carried by an independent chassis provided on the main body 10. In some embodiments, the motion assembly 50 may include an independent wheel assembly that is independent of the main body 10. The motion assembly 50 may be configured to move and cause the entire autonomous mobile device 5 to move.

The motion assembly 50 may be electrically connected with the controller 70, and configured to move under the control of the controller 70. More specifically, the motion assembly 50 may include a driving motor (e.g., an electrical motor) and motion components. The driving motor may be configured to drive the motion components to move under the control of the controller 70. In some embodiments, the motion components may include a wheel assembly (e.g., a pair of wheels provided at two opposite sides of the main body 10) and an omni-direction wheel. The driving motor may be configured to drive the wheel assembly to rotate, thereby causing the autonomous mobile device 5 to move. The omni-direction wheel may be configured to assist in the turning of the autonomous mobile device 5. The motion components can include other suitable moving components, for example, a track chain or a walking component. The present embodiment does not limit the type of the motion component.

The imaging device 20 may be connected with the controller 70, and configured to capture images of the surrounding environment. The imaging device 20 may transmit acquired images (represented by image data) to the storage device 90 for storage, and the controller 70 may retrieve the images (represented by image data) from the storage device 90. The imaging device 20 may have photographing and/or video recording functions. In some embodiments, the imaging device 20 may be, for example, a still camera, a video camera (e.g., fish-eye camera), etc.

The communication device 80 may be connected with the controller 70, and configured to exchange signals (such as information and command) with a mobile terminal and/or a server shown in FIG. 4. Specifically, the communication device 80 may transmit information or data to the mobile terminal and/or the server, and receive command or data from the mobile terminal and/or the server. The communication device 80 may be a wired communication device, or may be a wireless communication device, such as a WiFi module, a GPRS module, a Zigbee module, a Bluetooth module, etc. The communication device 80 may include both hardware components such as antenna, circuits, and software components, such as program codes.

The storage device 90 may be connected with the controller 70, and configured to store various information, command, including, but not limited to, various commands, environmental information, parameters obtained by various sensors, images acquired by the imaging device 20, etc.

The controller 70 may be configured to process the received various information and command. The controller 70 may be locally disposed at the autonomous mobile device 5, or may be disposed at the user terminal or network server. When the controller 70 is locally disposed at the autonomous mobile device 5, the imaging device 20, the motion assembly 50, and the communication device 80 may be directly connected with the controller 70. When the controller 70 is disposed at the user terminal or the network server, the imaging device 20 and the motion assembly 50 may be connected with the controller 70 through the communication device 80. In some embodiments, the controller 70 can be selected from various programmable processors that have functions such as computation, information processing, and control, etc., for example, ARM, DSP, FPGA, GPU, CPU, etc. The present embodiment does not limit the type and model of the controller 70.

In some embodiments, the autonomous mobile device 5 may be a smart cleaning robot (referred to as a cleaning robot for simplicity). The autonomous mobile device 5 may include an execution unit. The execution unit of the cleaning robot may include a cleaning assembly 100. The cleaning assembly 100 may include cleaning components such as a side brush, a roller brush, a dust collecting box, and/or floor mopping components such as a mopping cloth, a water tank, etc.

The autonomous mobile device 5 may have a forward direction X, i.e., the forward moving direction of the autonomous mobile device 5 during a normal movement. The term "normal movement" refers to a movement of the autonomous mobile device 5 when executing a task, which is different from an abnormal movement mode such as a backward movement, a swing, etc., when the autonomous mobile device 5 is under a predicament escaping mode.

The detecting device 30 may include a sensor assembly. The sensor assembly may include a collision sensor. The autonomous mobile device 5 may sense an obstacle through the collision sensor colliding with the obstacle located in front of the autonomous mobile device. For example, the obstacle may be a wall, a refrigerator, a floor cabinet, etc. When the collision sensor collides with the obstacle, the main body 10 may re-configure the motion path. There may be one or multiple collision sensors. When there are multiple collision sensors, the collision sensors may be disposed along the circumference at predetermined intervals at the front external surface and/or the side external surface of the autonomous mobile device 5.

In some embodiments, the sensor assembly may also include a proximity sensor. The proximity sensor may sense whether an obstacle exists within a predetermined distance range at the front direction or side direction of the autonomous mobile device 5 without colliding with surrounding obstacles. When the proximity sensor senses the existence of the obstacle at the front direction or side direction, the controller 70 may control the main body 10 to avoid the obstacle or re-configure the motion path. There may be one or multiple proximity sensors. When there are multiple proximity sensors, the proximity sensors may be disposed along the circumference at predetermined intervals at the front external surface and/or the side external surface of the autonomous mobile device 5.

In some embodiments, the sensor assembly may also include a cliff sensor configured to sense whether there is a sunken or protruding zone in a front floor in the moving direction and/or in a side floor, such as stairs or a base of a floor lamp. When a sunken or protruding zone is sensed, the main body 10 can avoid it and re-configure the motion path. There may be one or multiple cliff sensors. When there are multiple cliff sensors, the cliff sensors may be disposed at a front lower portion and/or side lower portion of the main body 10.

It can be understood that the sensor assembly can include any one or more of the collision sensors, the proximity sensors, the cliff sensors. In some embodiments, the sensor assembly can include other types of sensors, such as a wheel drop sensor, a current/voltage detecting device, etc.

The autonomous mobile device 5 may also include motion sensors configured to obtain motion parameter information of the autonomous mobile device 5. The motion parameter information may include one or more motion parameters, such as a location, a displacement, a linear velocity, a linear acceleration, an angular velocity, and an angular acceleration. Correspondingly, the motion sensor may include an odometer and an inertial measurement unit (IMU). The odometer may be disposed on the wheel assembly. The IMU only need to move together with the autonomous mobile device 5 in order to obtain the motion parameter information, and thus, may be disposed on the external housing of the autonomous mobile device 5 or any other motion following component, and does not need to be connected with the motion assembly 50. The motion sensors may also include a displacement sensor. The displacement sensor may be a resistance type displacement sensor, an inductance type displacement sensor, a capacitance type displacement sensor, a strain type displacement sensor or a Hall effect displacement sensor, etc., which may be well known to a person having ordinary skills in the art. Based on their characteristics, the motion sensors may measure or calculate, based on measurement results, motion parameter information relating to one or more motion parameters, such as the location, the distance, the displacement, the angle, the linear velocity, and the linear acceleration, etc.

Using the motion sensors including an odometer and an IMU as an example, in some embodiments, the odometer may obtain the mileage, linear velocity and angular velocity of the motion of the main body 10, and then obtain the angle of the main body 10 from integration of the angular velocity. The IMU may obtain the linear acceleration, angular velocity of the main body 10, and then obtain the linear velocity and angle of the main body 10 from respective integration. The motion parameter information obtained by the odometer and the IMU can complement with one another, correct one another, to increase the accuracy of the motion parameter information. The controller 70 may correct accumulated errors of sensors such as the IMU in real time based on the image information acquired by the imaging device 20 and the motion parameter information of the main body 10, thereby enhancing the confidence level of the localization of the autonomous mobile device 5, and re-configuring the motion path of the main body 10.

In some embodiments, the imaging device 20 may be disposed at an upper surface of the main body 10 or a front circumferential surface of the main body 10, and may be configured to capture images of objects located above the main body 10 and/or in the front environment. In some embodiments, a sunken portion may be provided at the upper surface of the main body 10, and the imaging device 20 may be disposed in the sunken portion. A camera head of the imaging device 20 may be located inside the sunken portion or may protrude out of the upper surface of the main body 10. The imaging device 20 may be a monocular camera, a binocular camera, etc.

Acquisition of the image information by the imaging device 20 is affected by the environmental light intensity. If the light intensity is low, after an image captured by the imaging device 20 is processed to remove noise, an image contrast between a brightest pixel and a darkest pixel in the same image is relatively low. As a result, the autonomous mobile device 5 may be unable to extract feature points from the image, and unable to perform localization of the autonomous mobile device 5 based on feature points information included in the image. Alternatively, due to the change in the environmental lighting condition from time to time during a day, images of a same obstacle captured by the imaging device 20 may be different. As a result, feature points extracted in multiple times from multiple images of a same object captured in multiple movements of the autonomous mobile device 5 at different time of a day may appear different, and the autonomous mobile device 5 may not recognize the feature points as belonging to the same object. Consequently, the autonomous mobile device 5 may be unable to help the motion sensors to correct the cumulated errors based on the images obtained by the imaging device 20. As a result, when the autonomous mobile device 5 moves to the space under the obstacle 60, such as a bed, a table, a cabinet or a sofa, the environmental light intensity typically becomes lower, rendering the autonomous mobile device 5 unable to determine the operation status of itself and the accurate location of itself based on the acquired images of the lower surface of the obstacle 60. Alternatively, when the autonomous mobile device 5 moves to the space under the obstacle 60 at different times of a day, if the lighting conditions under the obstacle change, the autonomous mobile device 5 may be unable to determine the operation status of itself and the accurate location of itself based on the acquired images of the lower surface of the obstacle 60.

To address these issues, in some embodiments, the autonomous mobile device 5 of the present disclosure may include the detecting device 30 and the light source assembly 40. The detecting device 30 and the light source assembly 40 may be electrically connected with the controller 70, respectively. The detecting device 30 may be configured to detect whether the obstacle 60 exists within a predetermined distance range in the upward direction of the main body 10. The detecting device 30 may substantially not be affected by the intensity of the visible light. For example, the detecting device 30 may detect whether an obstacle exists within the predetermined distance range in the upward direction of the main body 10 using an infrared laser based distance measuring device or using ultrasound, which is not affected by the environmental light intensity of the visible light in the space under the obstacle 60. When the detecting device 30 detects that the obstacle 60 exists within the predetermined distance range in the upward direction of the main body 10, the controller 70 may control the light source assembly 40 to turn on, to illuminate a lower surface of the obstacle 60, such that the imaging device 20 can acquire adequately clear images of a lower surface of the obstacle 60 facing the floor. The lower surface of the obstacle 60 is described above, which is not repeated.

The light source assembly 40 may include a photodiode. When supplied with electricity, the photodiode emits a light to provide illumination for the imaging device 20. The light source assembly 40 may be disposed on the upper surface of the main body 10 that faces against the floor (i.e., faces upward), or may be disposed at a circumferential side surface of the main body 10 and faces upward.

In order for the detecting device 30 to be unaffected by the light intensity, the detecting device 30 may include a first detector 31. The first detector 31 may include a first transmitting terminal and a first receiving terminal. The first transmitting terminal may be configured to transmit a first detecting light in the upward direction of the main body 10. The first detecting light may not be affected by the environmental light intensity (e.g., may be an infrared light or an infrared laser). The first receiving terminal may be configured to receive a reflected light of the first detecting light generated when the first detecting light is reflected by the obstacle 60. As a result, the detecting device 30 may determine whether the obstacle 60 exists within the predetermined distance range in the upward direction of the main body 10 based on the reflected light. For different first detecting lights, the first detector 31 may have different structures and working principles.

Figure 6:
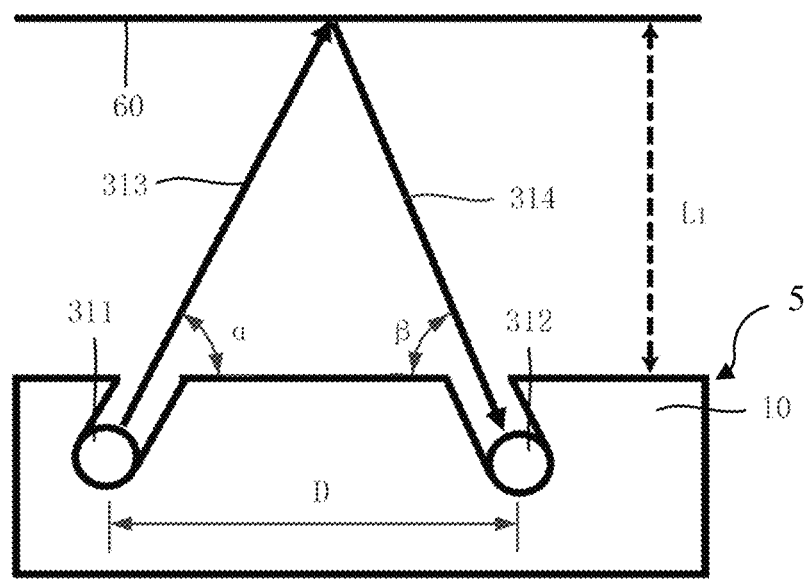
FIG. 6 is a diagram showing a working principle of an infrared diode detector.

In some embodiments, the first detecting light may be an infrared light. The first detector 31 may be an infrared diode detector. FIG. 6 is a diagram showing the working principle of an infrared diode detector. As shown in FIG. 6, the infrared diode detector may include a first transmitting terminal 311 and a first receiving terminal 312. The first transmitting terminal 311 may transmit an infrared light having a predetermined wavelength in the upward direction of the main body 10, i.e., a first detecting light 313. Reflection occurs when the infrared light encounters the obstacle 60. The first receiving terminal 312 of the infrared diode detector may receive the infrared light that is reflected back by the obstacle 60, i.e., a reflected light 314. The reflected light 314 is a reflected light of the first detecting light 313 generated when the first detecting light 313 is reflected back by the obstacle 60.

In some embodiments, through adjusting a location and a light outputting direction of the first transmitting terminal 311, and adjusting a location and a light inputting direction of the first receiving terminal 312, a predetermined distance $L_1$ between the infrared diode detector and the obstacle 60 may be determined. As shown in FIG. 6, assuming that the lower surface of the obstacle 60 located at the predetermined distance $L_1$ is parallel or substantially parallel with an upper surface of the main body 10, after determining a distance D between the first transmitting terminal 311 and the first receiving terminal 312, a facing direction of the first transmitting terminal 311 may be adjusted to adjust the light outputting direction of the first detecting light 313. Assuming that an angle formed by the light outputting direction of the first detecting light 313 and the main body 10 is α, then adjusting a facing direction of the first receiving terminal 312, such that the reflected light 314 of the first detecting light 313 generated when the first detecting light 313 is reflected by the lower side of the obstacle 60 facing the floor after the first detecting light 313 illuminates the obstacle 60 located at the distance $L_1$ from the infrared diode, may be received by the first receiving terminal 312. It is assumed that an angle between the reflected light 314 and the main body 10 is β.

Then, it can be known from FIG. 6, $$\frac{L_1}{\tan\alpha} + \frac{L_1}{\tan\beta} = D;$$

from the above equation, the predetermined distance $L_1$ between the infrared diode detector and the obstacle can be derived as, $$L_1 = D \times \frac{\tan\alpha \times \tan\beta}{\tan\alpha + \tan\beta}.$$

If there is no obstacle existing at the predetermined distance $L_1$ in the upward direction of the main body 10, then the first detecting light 313 transmitted by the first transmitting terminal 311 will not be reflected into the first receiving terminal 312, and therefore will not trigger the first detector. Consequently, the light source assembly 40 will not be turned on. Conversely, if there is an obstacle at the predetermined distance $L_1$ in the upward direction of the main body 10, then the first detecting light 313 transmitted by the first transmitting terminal 311 will be reflected by the lower surface of the obstacle 60. The reflected light 314 is received by the first receiving terminal 312. When a light intensity of the reflected light 314 reaches a predetermined value, the first detector is triggered and determines that the obstacle 60 is detected. Thus, the autonomous mobile device 5 senses that an obstacle exists at the predetermined distance $L_1$ in the upward direction. In some embodiments, when the infrared diode detector of the present embodiment is in operation, a shape of the lower surface of the obstacle 60 is not limited. In some embodiments, the first detector may have a working distance range for $L_1$, and may detect an obstacle only when the lower surface of the obstacle is within the working distance range for $L_1$. The infrared diode detector is merely one example of the detecting device 30. The detecting device 30 may be or include any other suitable detectors, which may have different working principles.

In some embodiments, the first detecting light may also be a laser or a modulated light. The first detector 31 may be a time of flight (TOF) sensor or a laser sensor. Using the TOF sensor as an example, a transmitting terminal of the TOF sensor may be configured to transmit a laser in the upward direction of the main body 10. After the laser encounters the obstacle 60, the laser is reflected back by the obstacle 60. A receiving terminal of the TOF sensor may receive the laser that is reflected by the obstacle 60. The TOF sensor may determine whether the obstacle 60 exists within the predetermined distance range in the upward direction of the main body 10 based on a time difference δt between the transmission of the laser by the transmitting terminal and the reception of the reflected laser by the receiving terminal, and based on the equation of L=c×δt, where c is the light speed. Substituting the maximum value and the minimum value of the predetermined distance range (e.g., Lmin, Lmax) into the above equation, a predetermined time range can be obtained for the time difference δt. When the measured time difference δt falls within the predetermined time range, the first detector 31 or the controller 70 may determine that the obstacle 60 exists within the predetermined distance range in the upward direction of the main body 10. Alternatively, based on the measured time difference δt from the TOF sensor, the distance L can be calculated by the controller 70. The controller 70 may compare the distance L with the predetermined distance range to determine whether the distance L falls within the predetermined distance range. If the distance L from the obstacle to the autonomous mobile device 5 falls out of the predetermined distance range, the controller 70 may not turn on the light source assembly 40 to provide illumination for the imaging device 20 to capture images of the obstacle 60. If the distance L is within the predetermined distance range, the controller 70 may turn on the light source assembly 40 to provide illumination for the imaging device 20 to capture images of the obstacle 60.

Taking into account the relatively high price for the TOF sensor that directly measures the laser, the laser may be modulated through a pulse or a continuous wave, and may be measured through a method of detecting a phase shift of the modulated light. A time difference between transmission of the modulated light and reception of the modulated light can be measured, and a distance between the TOF sensor and the obstacle 60 may be calculated based on the light speed and a wavelength of the modulated light. The controller 70 may compare the distance between the TOF sensor and the obstacle with the predetermined distance range to determine whether the measured distance falls within the predetermined distance range, and to further determine whether to turn on the light source assembly 40 to illuminate the obstacle 60 for the imaging device 20.

In some embodiments, the detecting wave transmitted by the first transmitting terminal may be a light wave or another type of wave, such as a sound wave, an ultrasound wave, a millimeter wave, a microwave, etc. Correspondingly, the first detector 31 may be an infrared diode detector, a laser distance measuring sensor (also referred to as a Light Detection and Ranging (Lidar); the TOF is a Lidar), or an ultrasound sensor, etc. In some embodiments, the distance measuring principle of the ultrasound sensor is similar to that of the TOF sensor. Hence, the principle of the ultrasound sensor is not described.

To increase the detecting accuracy, the first detector 31 may include one or more of an infrared diode detector, a laser based distance measuring sensor, and/or an ultrasound sensor.

The detecting device 30 may be configured to detect whether the obstacle 60 exists in the upward direction of the main body 10 through acquiring image information generated by a detecting light. Specifically, the detecting device 30 may also include a second detector 32. The second detector 32 may include a second transmitting terminal and a second receiving terminal. The second transmitting terminal may be configured to transmit a second detecting light in the upward direction of the main body 10. The second receiving terminal may receive the image information carried in a reflected light of the second detecting light generated when the second detecting light is reflected by the obstacle 60. The second detector 32 or the controller 70 may detect whether the obstacle 60 exists within a predetermined distance range in the upward direction of the main body 10 based on the image information.

In some embodiments, the second detecting light may be a structured light. After being projected onto a surface of an object, the structured light may be highly modulated by the surface of the object to be detected. The modulated structured light may be acquired by the second receiving terminal. The controller 70 may calculate a location and depth information of the object to be detected based on the image information.

The structured light is a detecting light actively transmitted by the second transmitting terminal, and is not affected by the environmental light intensity of the environment in which the main body 10 is located. The use of the structured light makes it convenient for the autonomous mobile device 5 to acquire the image information of the side of the obstacle 60 that faces the floor.

Correspondingly, the second transmitting terminal may be a structured light emitter. For different types of structured light emitters, the structured light emitted may be a stripped structured light, a coded structured light, or a speckle structured light. The second receiving terminal may be an image acquiring device. The image acquiring device may be a monocular or binocular camera that is well known by a person having ordinary skills in the art.

It can be understood that in some embodiments, the autonomous mobile device 5 may include both the first detector 31 and the second detector 32 to increase the detection accuracy.

In some embodiments, referring to FIG. 3, the detecting device 30 may be located in front of the light source assembly 40 and the imaging device 20 along a forward direction X of the main body 10, such that when the main body 10 moves along the forward direction X, assuming that the autonomous mobile device 5 moves to a space under the obstacle 60, the detecting device 30 may be moved to the space under the obstacle 60 before the light source assembly 40 and the imaging device 20 move into the space. When the detecting device 30 detects the obstacle 60, the controller 70 may control the light source assembly 40 to turn on, such that before the imaging device 20 moves into the space under the obstacle 60, or when the imaging device 20 moves into the space under the obstacle 60, the light source assembly 40 is already illuminating the space under the obstacle 60.

In some embodiments, the detecting device 30, the light source assembly 40, and the imaging device 20 may be sequentially disposed at an interval along the forward direction X of the main body 10. Alternatively, a virtual line connecting the detecting device 30, the light source assembly 40, and the imaging device 20 may be in a triangular configuration, in which configuration, the detecting device 30 may be located in front of the light source assembly 40 and the imaging device 20 along the forward direction X.

Taking into consideration that the main body 10 may perform a backward movement, the detecting device 30 may be arranged to be flush with the light source assembly 40 and the imaging device 20 in a direction perpendicular to the forward direction X. That is, a virtual line connecting the detecting device 30, the light source assembly 40, and the imaging device 20 may be perpendicular to the forward moving direction of the main body 10, such that when the detecting device 30 detects the obstacle 60, the controller 70 may turn on the light source assembly 40 at the same time to provide illumination for the imaging device 20, without being affected by the forward or backward movement of the main body 10.

From the above description, it can be known that when the autonomous mobile device 5 moves to the space under the obstacle 60, the controller 70 may determine the operation status of the main body 10 based on the image information of the lower surface of the obstacle 60 acquired by the imaging device 20 and other motion parameter information. When there is no need to reference to the image information obtained at an edge of the obstacle 60 and within a predetermined depth range horizontally, e.g., within 0-20 cm, after entering the space under the obstacle 60, the present embodiment does not limit the relative position between any two of the detecting device 30, the light source assembly 40, and the imaging device 20. The detecting device 30, the light source assembly 40, and the imaging device 20 may be disposed at any location on the main body 10 based on specific application, as along as the detecting device 30 can detect the obstacle 60 located above the main body 10, the light source assembly 40 can emit a light in the upward direction of the main body 10, and the imaging device 20 can acquire the image information of a lower surface of the obstacle 60 that faces the floor. In other words, the present embodiment does not limit the relative position of the detecting device 30, the light source assembly 40, and the imaging device 20. Even if the detecting device 30 is disposed behind the light source assembly 40 and/or the imaging device 20 along the forward direction of the main body 10 (relative to the forward direction of the main body 10), there may be some delay in the detection of the obstacle 60 located above the main body 10, it may not seriously affect the light source assembly 40 to provide supplemental light illumination to the imaging device 20 in subsequent processes.

It can be understood that when the height of the lower space under the obstacle exceeds a predetermined range, the light intensity in the space under the obstacle is relatively high, and does not affect the acquisition of the image information by the imaging device 20. In such a situation, it is not necessary to provide supplemental light illumination to the imaging device 20. Therefore, the predetermined distance range in the upward direction of the main body 10 may be smaller than or equal to 0.85 m (i.e., 0.85 meters). That is, a distance between a highest point of the main body 10 in the vertical direction or a highest point of the detecting device 30 in the vertical direction and the obstacle 60 may be smaller than or equal to 0.85 m. In related technology, the height of the lower space under a bed, a table, a sofa typically may not exceed 0.85 m, i.e., may not exceed a sum of 0.85 m and the height of the main body 10 in the vertical direction. Thus, the coverage range of the autonomous mobile device is broad.

In some embodiments, the predetermined direction may include an oblique upward direction of the main body 10. The oblique upward direction may be an oblique upward direction from any circumferential location of the main body 10.

In some embodiments, the oblique upward direction may be a front upward direction in the front and forward direction of the main body 10. The imaging device 20 may acquire image information in the front upward direction of the main body 10. In the disclosed autonomous mobile device 5, the acquisition range of the imaging device 20 is broad, and the measurement accuracy is high.

It can be understood that for different types of the imaging device 20, the illuminance (the unit of the illuminance is Lux, lx) needed by the imaging device 20 may be different, i.e., the minimum light intensity required for imaging may be different. When a point light source is used for illumination, the illuminance at a surface of an object perpendicular to the light is proportional to the light intensity of the light source, and is inversely proportional to square of the distance between the illuminated surface and the point light source. That is, the illuminance of the illuminated surface of the illuminated object is associated with the light outputting intensity of the light source assembly 40, and the distance between the light source assembly 40 and the lower surface of the obstacle 60.

When the light intensity of the light source assembly 40 is the same, the larger the distance between the light source assembly 40 and the lower surface of the obstacle 60, the lower the illuminance at the lower surface of the obstacle 60. Conversely, the smaller the distance between the light source assembly 40 and the lower surface of the obstacle 60, the higher the illuminance at the lower surface of the obstacle 60. When the illuminance is overly low, the imaging device 20 cannot effectively acquire image information of the lower surface of the obstacle 60 through the reflected light. When the illuminance is overly high, it may blind the imaging device 20, similar to the situation where a headlamp of a car directly illuminating human eyes in a dark night can make the person unable to see surrounding objects clearly. In such a situation, the imaging device 20 also cannot effectively acquire the image information of the lower surface of the obstacle 60.

To avoid the situation where the distance between the obstacle 60 and the main body 10 is overly large or overly small, resulting in an overly low or overly high illuminance after the light emitted by the light source assembly 40 is reflected by the lower surface of the obstacle 60, which may affect the acquisition of the image information of the lower surface of the obstacle 60 by the imaging device 20, in the present disclosure, the detecting device 30 also includes a distance measuring device disposed on the main body 10. The distance measuring device may be the laser distance measuring sensor described in the above embodiment. In some embodiments, the controller 70 may directly obtain a value of the distance between the main body 10 and the obstacle 60 through the distance measuring device, and may adjust the light outputting intensity of the light source assembly 40 based on the value of the distance and an inverse proportion rate between the above-described illuminance and the square of the distance.

In some embodiments, if the measured value of the distance is relatively large, then the controller 70 may control the light source assembly 40 to output a light at a relatively higher light outputting intensity; if the measured value of the distance is relatively small, then the controller 70 may control the light source assembly 40 to output a light at a relatively lower light outputting intensity. In some embodiments, the autonomous mobile device 5 may calibrate the light outputting intensity of the light source assembly 40 at multiple preset standard distances, such that when the light output from the light source assembly 40 illuminates the obstacle 90 within the predetermined distance range, the illuminance is suitable for the imaging device 20 to obtain discernable image information. Alternatively, in some embodiments, the distance measuring device may be an independent component different from the first detecting device, and may be disposed on the main body in parallel with the first detecting device.

The distance measuring device is configured to measure the distance between the main body 10 and the obstacle 60. In some embodiments, the distance measuring device may be configured to measure a distance between a location-to-be-detected of the main body 10 and a lower surface of the obstacle 60. In some embodiments, the location-to-be-detected of the main body 10 may be an upper surface of the main body 10. In some optional embodiments, a groove for mounting the distance measuring device may be provided on the main body 10. Then the location-to-be-detected of the main body 10 may be any location in the groove, as long as the distance between the main body 10 and the obstacle 60 can correspond to the illuminance. The present embodiment does not limit the location-to-be-detected of the main body 10. In some embodiments, if the lower surface of the obstacle 60 is a plane that is not parallel with the floor, for example, multiple planes that are respectively parallel with the floor, or a slanted plane forming a non-zero angle with the floor, then the distance between the main body 10 and the obstacle 60 may be represented by a distance between the main body 10 and a certain plane of the obstacle 60 that is parallel with the floor, or may be represented by a mean value of the distances between the main body 10 and multiple measuring points of the obstacle 60.

In some embodiments, the distance between the main body 10 and the obstacle 60 may be obtained by the distance measuring device, and the light outputting intensity of the light source assembly 40 may be controlled based on this distance, to provide sufficient but not overly bright illumination for the imaging device 20, thereby facilitating the imaging device 20 to acquire discernable image information.

It can be understood that in different time segments, the environmental light intensity may be different. For example, the light intensity may be high at noon, and the light intensity may be low in the morning and the night. In addition, in the morning and night time segments, the oblique angle of the light is large. When the floor is a glossy floor such as granite, etc., the floor may generate specular reflection, such that the light intensity at the side of the obstacle 60 that faces the floor becomes even higher. In such situations, if light is supplemented through the light source assembly 40, there is a risk of blinding the imaging device 20, rendering it unable to effectively acquire the image information.

Correspondingly, the detecting device 30 of the present embodiment may also include a light intensity measuring device configured to detect an environmental light intensity (e.g., ambient light intensity) in the space at a side of the obstacle 60 facing the floor. The controller 70 may be electrically connected with the light intensity measuring device, and configured to control the light outputting intensity of the light source assembly 40 based on the measured environmental light intensity at the side of the obstacle 60 facing the floor. The light intensity measuring device may include any suitable light intensity sensor known to a person having ordinary skills in the art, and is not limited by the present embodiment.

The illuminance needed by different imaging devices 20 may be different. In some embodiments, the illuminance needed by the imaging device 20 may be 0.5 lx-10000 lx.

In other words, when the illuminance of the side of the obstacle 60 facing the floor measured by the light intensity measuring device is greater than 10000 lx, even if the light source assembly 40 does not provide supplemental light, the imaging device 20 may be blinded. In such situations, the autonomous mobile device 5 may beep an alarm. When the illuminance at the side of the obstacle 60 facing the floor is lower than 0.5 lx, the light source assembly 40 may be turned on to provide supplemental light. With the supplemental light, the illuminance at the side of the obstacle 60 facing the floor may be adjusted to be within 2000 lx-4000 lx.

Figure 5:
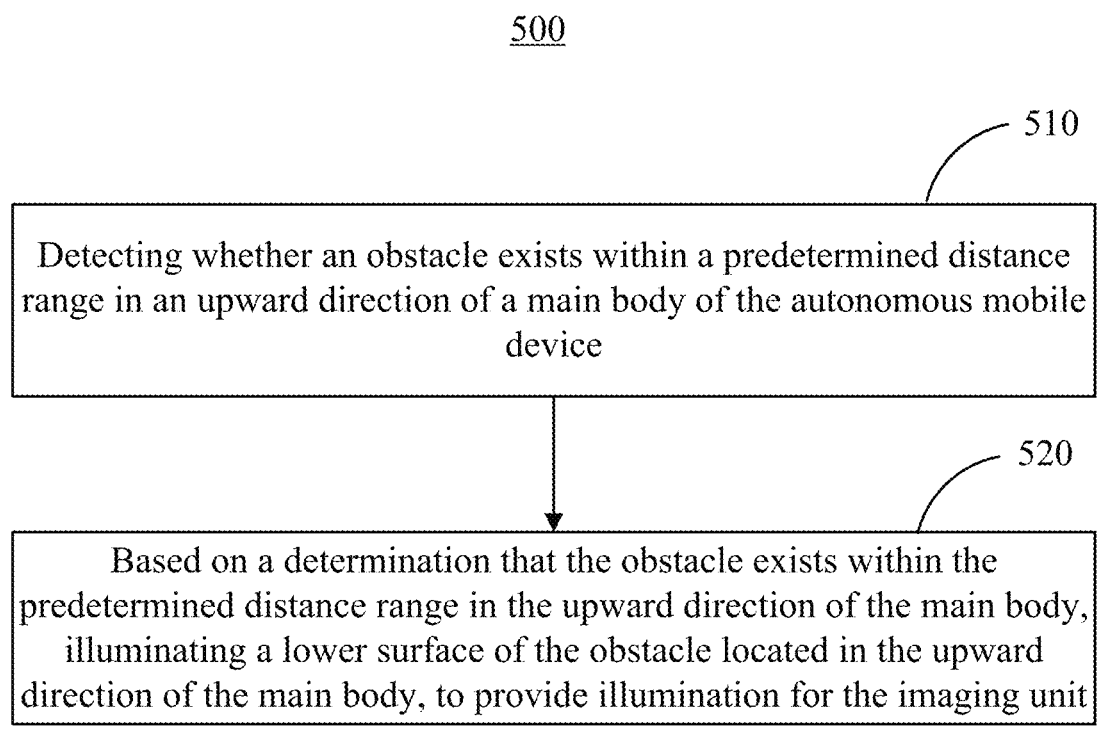
FIG. 5 is a flowchart illustrating a method for controlling the autonomous mobile device, according to an embodiment of the present disclosure.

The present disclosure also provides a method for controlling an autonomous mobile device. FIG. 5 is a flowchart illustrating a method 500 for controlling the autonomous mobile device 5. The method 500 may also be referred to as a control method 500. As shown in FIG. 5, the method 500 may include: detecting whether an obstacle (e.g., the obstacle 60) exists within a predetermined distance range in an upward direction of the main body 10 of the autonomous mobile device (step 510); and based on a determination that the obstacle (e.g., obstacle 60) exists within the predetermined distance range in the upward direction of the main body 10, illuminating a lower surface of the obstacle 60 located in the upward direction of the main body 10, to provide illumination for the imaging device 20 (step 520). The light source assembly 40 of the autonomous mobile device 5 may be controlled to turn on by the controller 70, to illuminate the lower surface of the obstacle 60 located in the upward direction of the main body 10. Alternatively, the first detector 31 may be directly electrically connected with the light source assembly 40. When the first detector 31 senses the obstacle 60 located thereabove, the light source assembly 40 may be directly controlled to turn on, by the controller 70 or by the first detector 31. For example, the first detector 31 may output a signal to directly turn on the light source assembly 40. The direct or indirect control of the light source assembly 40 by the first detector 31 may be realized through other existing technologies known to a person having ordinary skills in the art.

In some embodiments, the control method 500 may be implemented in the above-described autonomous mobile device 5. When the autonomous mobile device 5 moves within a work zone, the autonomous mobile device 5 may encounter obstacles such as a wall, a refrigerator, or may encounter depression-type obstacles such as stairs, or hollow-lower-portion type obstacles 60 such as a bed, a sofa, etc.

Without the supplemental light from the light source assembly 40, the light intensity in the space under the obstacle 60 may be low, and the imaging device 20 of the autonomous mobile device 5 may not acquire clear images at the side of the obstacle 60 facing the floor, rendering the autonomous mobile device 5 unable to determine the location and/or operation status of itself.

In some embodiments, when the detecting device 30 detects that the main body 10 enters into the space under the obstacle 60, and when the controller 70 determines that the obstacle 60 is located within a predetermined distance range above the autonomous mobile device 5, the controller 70 of the autonomous mobile device 5 may control the light source assembly 40 to turn on. The light source assembly 40 illuminates the lower surface of the obstacle 60, to provide illumination for the imaging device 20, such that the imaging device 20 can acquire useable image information of the side of the obstacle 60 that faces the floor, enabling the autonomous mobile device 5 to perform localization and mapping and to determine the operation status of itself.

The present disclosure also provides a non-transitory computer-readable storage medium. The non-transitory computer-readable storage medium may be configured to store a computer program formed by computer codes. When the computer program is executed by a processor, the method 500 for controlling the autonomous mobile device 5 described in the above embodiment may be performed.

In some embodiments, the present disclosure provides a method for controlling an autonomous mobile device. The method includes determining, by a controller of the autonomous mobile device, based on a signal received from a detecting device, whether an obstacle exists within a predetermined distance range in an upward direction of a main body of the autonomous mobile device. The method also includes based on a determination that the obstacle exists within the predetermined distance range in the upward direction of the main body, controlling a light source assembly to illuminate a lower surface of the obstacle located in the upward direction of the main body, to provide illumination for an imaging device included in the autonomous mobile device.

In some embodiments, the method also includes detecting, by the detecting device, the obstacle and measuring, by the detecting device, a distance between an upper surface of the main body and a lower surface of the obstacle. In some embodiments, determining, by the controller of the autonomous mobile device, based on a signal received from the detecting device, whether the obstacle exists within the predetermined distance range in the upward direction of the main body of the autonomous mobile device includes: determining whether the distance is within the predetermined distance range. In some embodiments, based on a determination that the obstacle exists within the predetermined distance range in the upward direction of the main body, controlling the light source assembly to illuminate the lower surface of the obstacle located in the upward direction of the main body, to provide illumination for the imaging device included in the autonomous mobile device includes: based on a determination that the distance is within the predetermined distance range, turning on the light source assembly to illuminate the lower surface of the obstacle; or based on a determination that the distance is not within the predetermined distance range, not turning on the light source assembly to illuminate the lower surface of the obstacle.

In some embodiments, the method includes detecting, by the detecting device, the obstacle and measuring, by the detecting device, a distance between an upper surface of the main body and a lower surface of the obstacle. In some embodiments, determining, by the controller of the autonomous mobile device, based on a signal received from the detecting device, whether the obstacle exists within the predetermined distance range in the upward direction of the main body of the autonomous mobile device includes: determining whether the distance is within the predetermined distance range. In some embodiments, based on a determination that the obstacle exists within the predetermined distance range in the upward direction of the main body, controlling the light source assembly to illuminate the lower surface of the obstacle located in the upward direction of the main body, to provide illumination for the imaging device included in the autonomous mobile device includes: based on a determination that the distance is within the predetermined distance range, adjusting a light outputting intensity of the light source assembly based on the distance.

In some embodiments, the present disclosure provides a non-transitory computer-readable storage medium encoded with a computer program, wherein when the computer program is executed by a processor of an autonomous mobile device, a method is performed by the autonomous mobile device. The method includes: determining, by the processor based on a signal from a detecting device of the autonomous mobile device, whether an obstacle exists within a predetermined distance range in an upward direction of a main body of the autonomous mobile device; and based on a determination that the obstacle exists within the predetermined distance range in the upward direction of the main body, controlling, by the processor, a light source assembly to illuminate a lower surface of the obstacle located in the upward direction of the main body, to provide illumination for an imaging device included in the autonomous mobile device. In some embodiments, the method further includes: detecting, by the detecting device, the obstacle and measuring, by the detecting device, a distance between an upper surface of the main body and a lower surface of the obstacle. In some embodiments, determining, by the processor of the autonomous mobile device, based on a signal received from the detecting device, whether the obstacle exists within the predetermined distance range in the upward direction of the main body of the autonomous mobile device includes: determining whether the distance is within the predetermined distance range. In some embodiments, based on a determination that the obstacle exists within the predetermined distance range in the upward direction of the main body, controlling, by the processor, the light source assembly to illuminate the lower surface of the obstacle located in the upward direction of the main body, to provide illumination for the imaging device included in the autonomous mobile device includes: based on a determination that the distance is within the predetermined distance range, turning on the light source assembly to illuminate the lower surface of the obstacle; or based on a determination that the distance is not within the predetermined distance range, not turning on the light source assembly to illuminate the lower surface of the obstacle.

The non-transitory computer-readable storage medium may be realized by any suitable type of storage medium, such as a static random access memory (SRAM), an electrically erasable programmable read only memory (EEPROM), an erasable programmable read only memory (EPROM), a programmable read only memory (PROM), a read only memory (ROM), a magnetic storage device, a flash memory, a magnetic disc or an optical disc. The computer-readable storage medium may be any useable medium that can be read and written by a general-purpose or a specialized computer.

An exemplary computer-readable storage medium may be coupled with a processor included in the controller 70, such that the processor can retrieve information from the computer-readable storage medium, and write information into the computer-readable storage medium. In some embodiments, the computer-readable storage medium may also be a portion of the processor. The processor and the computer-readable storage medium may be integrated in Application Specific Integrated Circuits (ASIC). In some embodiments, the processor and the computer-readable storage medium may be separate components in a device.

A person having ordinary skills in the art can understand: all or some steps for realizing the above embodiments of the methods can be realized by hardware related to program instructions. The above-described program can be stored in a computer-readable storage medium. When the program is executed, the steps of the methods in the above various embodiments can be performed. The storage medium described above may include: various types of media for storing program codes such as ROM, RAM, magnetic disc or optical disc, etc.

In this specification, the various embodiments or implementations are described in a progressive manner. Descriptions of key features of each embodiment are the differences from other embodiments. The same or similar portions of various embodiments can refer to respective related descriptions.

In the descriptions of this specification, descriptions of reference terms "an embodiment," "some embodiments," "illustrative embodiments," "example," "specific example," or "some examples" etc. means that certain specific feature, structure, material or characteristic described in connection with the embodiments or examples is included in at least one embodiment or example. In the present specification, the illustrative descriptions for the above terms do not necessarily refer to the same implementation or example. Further, the described specific feature, structure, material or characteristic may be combined in a suitable manner in any one or multiple embodiments or examples.

Finally, it should be noted that the above various embodiments are described to explain the technical solutions of the present disclosure, and are not intended to limit the scope thereof. Although the present disclosure is described in detail with reference the previously described embodiments, a person having ordinary skills in the art should understand, that the technical solution described in the various embodiments can be modified, or some or all technical features may be substituted by equivalents. These modifications or substitutions do not render the principle of the pertinent technical solutions to fall outside of the scope of the technical solutions of the various embodiments of the present invention.

What is claimed is:

1. An autonomous mobile device, comprising:
a main body; and
an imaging device, a detecting device, a light source assembly, and a controller disposed at the main body,
wherein the imaging device is connected with the main body, and is configured to acquire first image information in a predetermined direction of the main body, the predetermined direction includes an upward direction of the main body, wherein the detecting device is connected with the main body, and is configured to detect an obstacle in the upward direction of the main body, wherein the light source assembly is connected with the main body, and a light outputting direction of the light source assembly includes the upward direction of the main body, and wherein the controller is electrically connected with the detecting device and the light source assembly, and is configured to, based on a detection of the obstacle within a predetermined distance range in the upward direction of the main body, control the light source assembly to turn on to illuminate a lower surface of the obstacle, to thereby provide illumination for the imaging device.

2. The autonomous mobile device of claim 1, wherein the detecting device includes a first detector, and the first detector includes a first transmitting terminal and a first receiving terminal, the first transmitting terminal is configured to transmit a first detecting light in the upward direction of the main body, the first receiving terminal is configured to receive a reflected light of the first detecting light generated when the first detecting light is reflected back by the obstacle, the first detector is configured to determine whether the obstacle exists within the predetermined distance range in the upward direction of the main body based on the reflected light.

3. The autonomous mobile device of claim 2, wherein the first detector is one or more of an infrared diode detector or a laser distance measuring sensor.

4. The autonomous mobile device of claim 2, wherein the detecting device includes a second detector, and the second detector includes a second transmitting terminal and a second receiving terminal, the second transmitting terminal is configured to transmit a second detecting light in the upward direction of the main body, the second receiving terminal is configured to receive second image information carried by a reflected light of the second detecting light generated when the second detecting light is reflected back by the obstacle, the second detector is configured to determine whether the obstacle exists within the predetermined distance range in the upward direction of the main body based on the second image information.

5. The autonomous mobile device of claim 4, wherein the second transmitting terminal is a structured light emitter, and the second receiving terminal is an image acquiring device.

6. The autonomous mobile device of claim 1, wherein the detecting device includes a first detector, and the first detector includes a first transmitting terminal and a first receiving terminal, the first transmitting terminal is configured to transmit a detecting wave in the upward direction of the main body, the first receiving terminal is configured to receive a reflected wave of the detecting wave generated when the detecting wave is reflected back by the obstacle, the first detector is configured to determine whether the obstacle exists within the predetermined distance range in the upward direction of the main body.

7. The autonomous mobile device of claim 6, wherein the first detector includes an ultrasonic sensor.

8. The autonomous mobile device of claim 6, wherein the detecting device includes a second detector, and the second detector includes a second transmitting terminal and a second receiving terminal, the second transmitting terminal is configured to transmit a second detecting light in the upward direction of the main body, the second receiving terminal is configured to receive second image information carried by a reflected light of the second detecting light generated when the second detecting light is reflected back by the obstacle, the second detector is configured to determine whether the obstacle exists within the predetermined distance range in the upward direction of the main body based on the second image information.

9. The autonomous mobile device of claim 8, wherein the second transmitting terminal is a structured light emitter, and the second receiving terminal is an image acquiring device.

10. The autonomous mobile device of claim 1, wherein along a forward direction of the main body, the detecting device is located in front of the light source assembly and the imaging device.

11. The autonomous mobile device of claim 1, wherein the detecting device is flush with the light source assembly and the imaging device along a direction perpendicular to a forward moving direction of the autonomous mobile device.

12. The autonomous mobile device of claim 1, wherein the predetermined distance range is smaller than or equal to 0.85 m.

13. The autonomous mobile device of claim 1, wherein a light outputting intensity of the light source assembly is adjustable, the detecting device also includes a distance measuring device, the distance measuring device is connected with the main body, and is configured to measure a distance between the main body and the obstacle located in the upward direction of the main body, the controller is electrically connected with the distance measuring device, and is configured to control the light outputting intensity of the light source assembly based on the distance between the main body and the obstacle measured by the distance measuring device, and the controller is configured to increase the light outputting intensity of the light source assembly as the distance increases, and decrease the light outputting intensity of the light source assembly as the distance decreases.

14. The autonomous mobile device of claim 1, wherein the detecting device includes a light intensity measuring device, the light intensity measuring device is connected with the main body and is configured to measure an environmental light intensity in the upward direction of the main body, and the controller is electrically connected with the light intensity measuring device, and is configured to control whether the light source assembly outputs a light based on the environmental light intensity measured by the light intensity measuring device.

15. The autonomous mobile device of claim 1, wherein the detecting device includes a light intensity measuring device, the light intensity measuring device is connected with the main body and is configured to measure an environmental light intensity in the upward direction of the main body, and the light outputting intensity of the light source assembly is adjustable, the controller is electrically connected with the light intensity measuring device, and is configured to control the light outputting intensity of the light source assembly based on the environmental light intensity measured by the light intensity measuring device.

16. A method for controlling an autonomous mobile device, comprising:
- detecting whether an obstacle exists within a predetermined distance range in an upward direction of a main body of the autonomous mobile device; and
- based on a determination that the obstacle exists within the predetermined distance range in the upward direction of the main body, illuminating a lower surface of the obstacle located in the upward direction of the main body, to provide illumination for an imaging device included in the autonomous mobile device.

17. The method of claim 16, wherein detecting whether an obstacle exists within a predetermined distance range in an upward direction of a main body of the autonomous mobile device comprises:
- detecting the obstacle and measuring a distance between an upper surface of the main body and a lower surface of the obstacle;
- determining whether the distance is within the predetermined distance range; and
- based on a determination that the distance is within the predetermined distance range, turning on a light source assembly to illuminate the lower surface of the obstacle,
- wherein the method further comprises:
  - based on a determination that the distance is not within the predetermined distance range, not turning on the light source assembly to illuminate the lower surface of the obstacle.

18. The method of claim 16,
- wherein detecting whether an obstacle exists within a predetermined distance range in an upward direction of a main body of the autonomous mobile device comprises:
  - detecting the obstacle and measuring a distance between an upper surface of the main body and a lower surface of the obstacle;
- wherein the method further comprises:
  - adjusting a light outputting intensity of a light source assembly based on the distance.

19. A non-transitory computer-readable storage medium encoded with a computer program, wherein when the computer program is executed by a processor, a method is performed by an autonomous mobile device, the method comprising:
- detecting whether an obstacle exists within a predetermined distance range in an upward direction of a main body of the autonomous mobile device; and
- based on a determination that the obstacle exists within the predetermined distance range in the upward direction of the main body, illuminating a lower surface of the obstacle located in the upward direction of the main body, to provide illumination for an imaging device included in the autonomous mobile device.

20. The non-transitory computer-readable storage medium of claim 19, wherein detecting whether an obstacle exists within a predetermined distance range in an upward direction of a main body of the autonomous mobile device comprises:
- detecting the obstacle and measuring a distance between an upper surface of the main body and a lower surface of the obstacle;
- determining whether the distance is within the predetermined distance range; and
- based on a determination that the distance is within the predetermined distance range, turning on a light source assembly to illuminate the lower surface of the obstacle,
- wherein the method further comprises: based on a determination that the distance is not within the predetermined distance range, not turning on the light source assembly to illuminate the lower surface of the obstacle.

* * * * *